L. A. HAWKINS.
INDICATOR.
APPLICATION FILED DEC. 1, 1911.
1,038,365.
Patented Sept. 10, 1912.
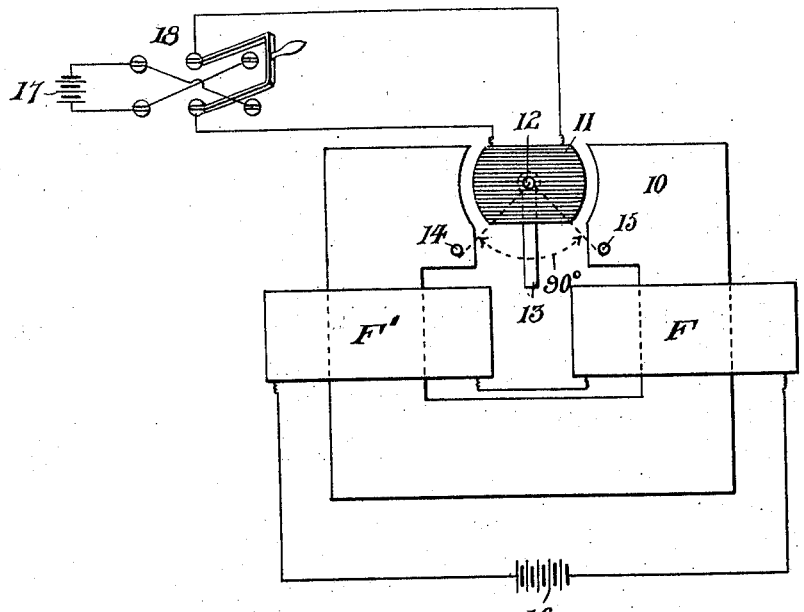
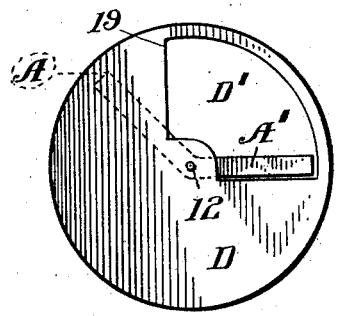
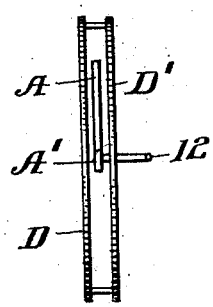
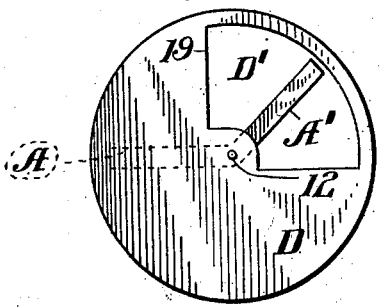
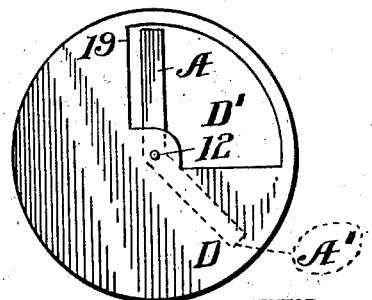

UNITED STATES PATENT OFFICE.

LAURENCE A. HAWKINS, OF SCHENECTADY, NEW YORK, ASSIGNOR, BY MESNE ASSIGNMENTS, TO THE UNION SWITCH AND SIGNAL COMPANY, A CORPORATION OF PENNSYLVANIA.

INDICATOR.

1,038,365.　　　　　Specification of Letters Patent.　　Patented Sept. 10, 1912.

Application filed December 1, 1911. Serial No. 663,1;;

*To all whom it may concern:*

Be it known that I, LAURENCE A. HAWKINS, a citizen of the United States, residing at Schenectady, in the county of Schenectady and State of New York, have invented certain new and useful Improvements in Indicators, of which the following is a specification.

My invention relates to indicators of the three-position type, and particularly to indicators adapted for use for railway signaling purposes.

I will describe one form of my invention, and then point out the novel features thereof in claims.

In the accompanying drawings, Figure 1 is a diagrammatic view illustrating one form of motor device adapted to actuate an indicator embodying my invention. Figs. 2, 3 and 4 are views showing in front elevation, an indicator embodying my invention, the indicating blade being in three different positions of indication. Fig. 5 is a side elevation of the indicator shown in Figs. 2, 3 and 4.

Similar reference characters refer to similar parts in each of the several views.

An indicator embodying my invention is particularly well adapted for use in railway signaling, although its use is not limited to such purposes. As is well known, in the case of a three-position semaphore signal employed in railway signaling, the horizontal position of the semaphore usually indicates "danger", the inclined position "caution", and the vertical position "clear", the inclined and vertical positions being either both above or both below the horizontal position. When a three-position indicator is used to convey the same information as the railway signal just described it is desirable that the three positions of the indicator arm should correspond to the three positions assumed by the railway signal semaphore; that is, that the horizontal position should indicate danger and that the caution and clear positions of the arm should be both in one direction or the other from the danger position. But a three-position indicator is usually operated by an electric motor device of a two-winding type having a middle position when deënergized, and having movements in opposite directions from such middle position when energized according to whether the current in one of its windings flows in one direction or the other; and the deënergized position of the motor device corresponds to the danger position of the indicator arm. Hence when but one indicator arm is used in connection with such a device, the caution and clear positions are in opposite directions from the danger position, which is less desirable than the usual arrangement of indicating positions for signals described above.

One feature of my invention is the provision of an indicator which may be operated by an electric motor device such as that just mentioned, and whose caution and clear positions will both be in one direction from the danger position.

In Fig. 1 of the accompanying drawings I have shown one type of electric motor device which may be employed to operate an indicator embodying my invention, but I do not wish to be limited to this particular type of motor device. This motor comprises a magnetic field 10 provided with energizing windings F and F' and an armature 11. As here shown the field windings are permanently connected with a source of current 16, and the armature is connected with another source of current 17 through a reversing switch 18. It is understood however that the armature might equally well be permanently connected with a source of current, and the reversing switch be inserted in the connections between the field windings and their source of current 16. The sources of current 16 and 17 may be either direct or alternating. When the reversing switch 18 is open, thereby deënergizing the armature 11, the armature will assume a middle position as shown in Fig. 1 because of the counter-weight 13; when the switch is closed on one side the armature will move in one direction from the middle position, and when the switch is closed on the other side the armature will move in the other direction from its middle position, its movement in each direction being limited by the engagement of the counterweight 13 with stops 14 and 15.

Referring now to Figs. 2, 3, 4 and 5, the indicator blade comprises two arms A and A' operatively connected with the armature 11. As here shown the armature and the blade are both rigidly mounted on a shaft 12, although other methods of connecting them may of course be used. The indicator is provided with two parallel disks D and D' mounted a sufficient distance apart to permit of free movement of the indicator arms between them as shown in Fig. 5. A sector shaped opening 19 is cut in disk D as shown in the drawings, to disclose a portion of disk D'.

The indicator blade is so mounted upon the shaft 12 that when the armature 11 occupies its middle or deënergized position the arms will be as shown in Fig. 2, arm A' being disclosed through opening 19 in the horizontal or "danger" position. When the armature moves in a counter-clockwise direction until it engages stop 15, the indicator arms will assume the positions shown in Fig. 3, arm A' being still disclosed, but lying in the inclined or "caution" position. When armature 11 moves in the reverse direction until it engages stop 14, the indicator arms will assume the positions shown in Fig. 3, arm A being then disclosed in the vertical or "clear" position, and arm A' being obscured from view. It will be seen from the foregoing that by the use of the two arms A and A' the indications given by the indicator correspond in position to those given by the usual three-position signal.

As shown in the drawings, the angle between the two arms A and A' is 135° and the arms move through an angle of 45° in each direction from the middle position. Hence the caution and clear positions of the arms are respectively 45° and 90° above the horizontal position. Although as here shown the caution and clear positions are above the danger position, it is understood that the indicator might readily be modified to give the caution and clear positions below the danger position by merely placing the sector shaped opening 19 in the disk D below the horizontal line and mounting the arms A and A' at 180° from the position shown in the drawings.

Although I have herein shown and described only one form of indicator embodying my invention, it is understood that various changes and modifications may be made therein within the scope of the appended claims without departing from the spirit and scope of my invention.

Having thus described my invention, what I claim is:—

1. In a three-position indicator, a pivotally mounted indicator blade comprising two arms angularly disposed, a disk mounted in front of the blade, an opening in the disk through which one of the arms is disclosed when the blade occupies the middle position, means for moving the blade in one direction from the middle position to disclose the same arm in another position through said opening, and for moving the blade in the opposite direction from the middle position to disclose the other arm in a third position through the opening.

2. In a three-position indicator, the combination with a motor device having movement in opposite directions from a middle position, of a pivotally mounted indicator blade comprising two arms angularly disposed and operatively connected with the motor device, a disk mounted in front of the blade, an opening in the disk to disclose one of the arms when the motor device occupies its middle position, to disclose the same arm in another position when the motor device moves in one direction from the middle position, and to disclose the other arm in a third position when the motor device moves in the other direction from the middle position.

3. In a three-position indicator, a pivotally mounted indicator blade comprising two arms angularly disposed, a disk mounted in front of the blade, an opening in the disk through which one of the arms is disclosed in danger position when the blade occupies its middle position, means for moving the blade in one direction from the middle position to disclose the same arm in caution position through the opening, and for moving the blade in the other direction from its middle position to cover the said same arm and to disclose the other arm in clear position.

4. In a three position indicator, a pivotally mounted indicator blade comprising two arms disposed at substantially 135°, a disk mounted in front of the blade, an opening in the disk to disclose one of the arms in horizontal position when the blade occupies its middle position, means for moving the blade substantially 45° in one direction from its middle position to disclose the same arm in an inclined position and for moving the blade substantially 45° in the other direction from its middle position to cover the said same arm and to disclose the other arm in a vertical position.

In testimony whereof I affix my signature in presence of two witnesses.

LAURENCE A. HAWKINS.

Witnesses:
BENJAMIN B. HULL,
HELEN ORFORD.